United States Patent [19]

Palm

[11] Patent Number: 5,007,172

[45] Date of Patent: Apr. 16, 1991

[54] QUICK CHANGE GUIDE SHOE

[75] Inventor: Bernhard Palm, Brookfield, Wis.

[73] Assignee: Milwaukee Electric Tool Corporation, Brookfield, Wis.

[21] Appl. No.: 537,474

[22] Filed: Jun. 13, 1990

[51] Int. Cl.⁵ ............................................. B27B 11/02
[52] U.S. Cl. ...................................... 30/377; 30/392; 403/323
[58] Field of Search .................. 30/392, 373, 374, 375, 30/377; 403/323

[56] References Cited

U.S. PATENT DOCUMENTS

| | | | |
|---|---|---|---|
| 3,388,728 | 6/1968 | Riley, Jr. et al. | 30/392 |
| 3,496,972 | 2/1970 | Rees | 30/377 |
| 4,235,017 | 11/1980 | Yavis | 30/377 |
| 4,801,257 | 1/1989 | Lenk | 425/192 S |

Primary Examiner—Douglas D. Watts
Assistant Examiner—John M. Husar
Attorney, Agent, or Firm—Bayard H. Michael

[57] ABSTRACT

The power saw is provided with a shoe pivotally mounted on a post which is mounted in a cavity of the nose section of the gear case of the saw. The post has a multiplicity of grooves separated by lands which are flat between the grooves. A lock pin is mounted in the nose section transverse and spaced from the post. When the pin is in its normal locking position, the round exterior of the pin engages one of the grooves on the post to retain the post and shoe in position relative to the saw. The lock pin has a flat section which is parallel to and spaced from the flats on the post when the pin is rotated to the release position freeing the post and shoe for movement to adjust the position relative to the saw. A lever is mounted on the end of the pin which projects through the side of the gear case. The inside of the lever has a dimple which engages the soft boot covering the gear case. This develops enough friction to hold the lever in its normal position until manually actuated to release position allowing adjustment of the shoe position.

2 Claims, 1 Drawing Sheet

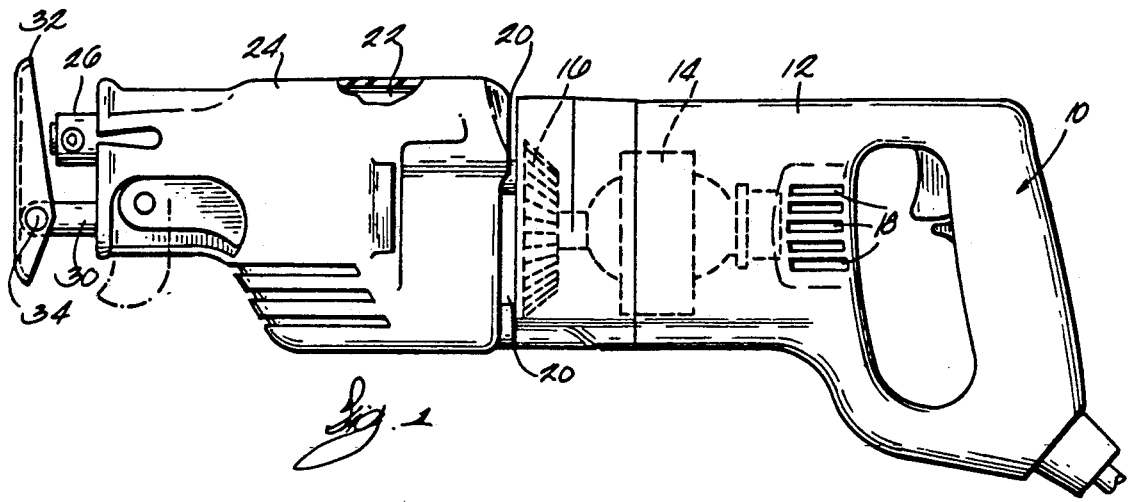
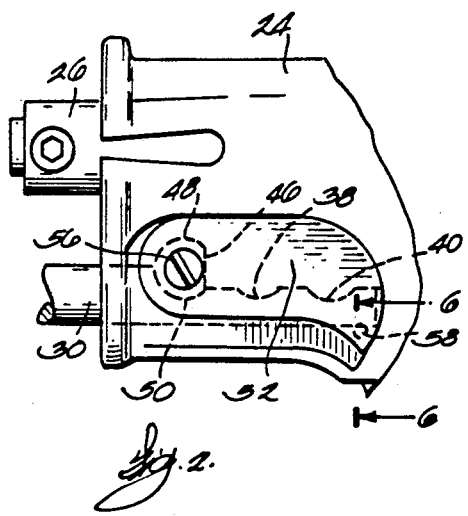
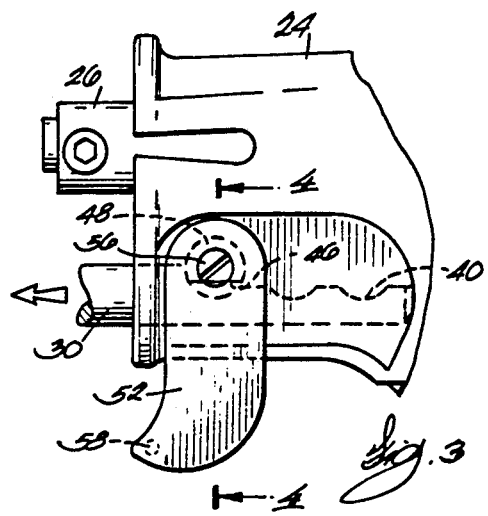
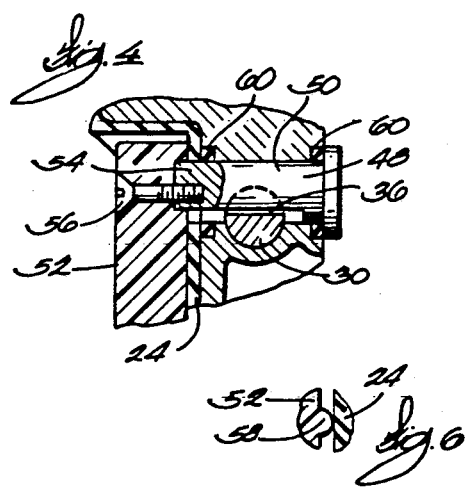
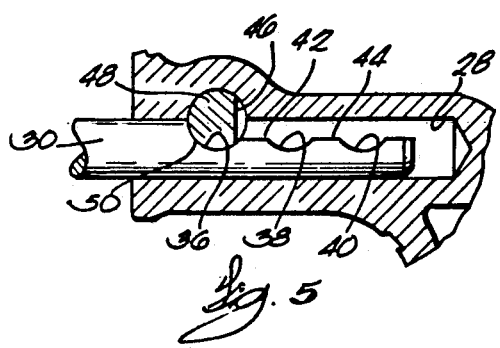

QUICK CHANGE GUIDE SHOE

BACKGROUND OF THE INVENTION

Reciprocating power saws are provided with a guide shoe to aid in positioning the saw on the work. The shoe has limited pivotal motion to accommodate changes in position of the saw relative to the work. It is desireable to adjust the spacing of the shoe relative to the body to adjust the depth of cut or the portion of the blade which will be effective, thus allowing all of the blade length to be used. A typical support for the shoe comprises a pair of support arms which lie on each side of the nose of the power tool. Screws pass through slots in the arms and thread into the nose of the tool to clamp the arms in the desired position. A screwdriver or wrench is necessary to make the adjustment, which takes appreciable time.

This invention simplifies adjustment and/or release of the shoe by eliminating the need for special tools.

SUMMARY OF THE INVENTION

This invention provides a reciprocating power saw with a shoe mounted on a post or support member which is slideably received in the nose section of the saw. The post has a plurality of transverse grooves or positioning surfaces spaced along the length of the post. A lock pin is pivotally mounted in the nose transverse to the post but spaced from the post far enough so the round portion of the pin will engage one of the grooves or positioning surfaces to lock the support member in position relative to the saw. The pin has a flat portion which clears (does not engage) the post when the pin is rotated to position the plane of the flat parallel to the axis of the post. The lock pin projects from the side of the nose section of the saw and has a lever mounted thereon for manual actuation of the lock pin. No tools are needed and the adjustment or removal of the shoe is very fast and simple.

BRIEF DESCRIPTION OF THE DRAWINGS

FIG. 1 is a side elevation of a power saw provided with this invention.

FIG. 2 is an enlarged detail view of the nose section of the saw.

FIG. 3 is similar to FIG. 2 but shows the lever actuated to allow adjustment of the shoe.

FIG. 4 is a section taken on line 4—4 in FIG. 3.

FIG. 5 is a view similar to a portion of FIG. 3 but has parts broken away and in section to show details of the construction.

FIG. 6 is a fragmentary section taken as indicated by line 6—6 in FIG. 2.

DETAILED DESCRIPTION OF THE DRAWINGS

The in-line reciprocating saw shown in the drawings has a handle portion 10 on the back of the motor housing 12 in which the drive motor 14 is enclosed. The motor also drives a cooling fan 16 which draws cooling air through the slots 18 to be exhausted through the space 20 between the housing and the gear case 22 on the front of the housing. The gear case 22 is covered by a boot 24 which is spaced from the gear case by ribs (not shown) on the inside of the boot. This arrangement provides for cooling air flow between the boot and the gear case to dissipate the heat built up by reason of the friction in the transmission in the case. This transmission (not shown) reciprocates the spindle 26 in which a saw blade is mounted in a conventional manner. The transmission preferably also reciprocates a counterbalance. The reciprocating action is produced by a double wobble plate drive disclosed in my copending application Ser. No. 487219, filed Mar. 1, 1990, now abandoned and continuation-in-part application Ser. No. 541,093, filed June 20, 1990, but the present invention is independent of the transmission and can be used with any reciprocating saw or tool using a guide shoe. Similarly, the spaced boot design is disclosed in my copending application Ser. No. 537,428, filed June 13, 1990, but the present invention does not require such a boot.

The gear case 22 is provided with a cavity or blind hole 28 which receives the support member or post 30 of the quick change shoe assembly. Thus, the shoe 32 is mounted on pivot 34 in the outer end of the post for limited rocking movement from its normal position approximately perpendicular to the post and blade. The rear portion of the post 30 is provided with three transverse position surfaces or grooves 36, 38, 40 separated by lands 42, 44 which lie in a plane which is below the plane of the flat 46 provided on the lock means or pin 48 rotatably mounted in the nose section of the gear case 22 transverse the axis of the post 30 when the pin 48 is rotated to position the flat 46 parallel to the lands 42, 44 on the post 30. This allows the post 30 to be moved freely in the hole 28 to adjust the position of the shoe 32 relative to the nose section and relative to the saw blade mounted in the reciprocating spindle 26. When the shoe 32 has been positioned in the desired position, the pin 48 is rotated to move the round portion 50 of the pin into registry with one of the position surfaces or grooves 36, 38, 40 in the post 30 to lock the post 30 and shoe 32 in adjusted position. This allows the saw to be used at different distances from the work so a selected portion of the blade can be used.

To rotate the pin 48, the user actuates the lever 52 mounted on the outer end 54 of the pin. The flat on the end of the pin engages a complimentary flat in the lever socket to positively register the lever to the pin. Screw 56 secures the lever to the pin. The inside of the lever is provided with a dimple 58 at the corner of the lever. This dimple bears on the somewhat soft material of the boot 24 to develop positive friction resisting movement of the lever, thus keeping the lever in its normal position. When the lever is moved to the position shown in FIG. 3, the dimple is out of contact with the boot and the frictional resistance is gone; but there is still a reduced friction imposed by the boot contacting the surface 50 of the pin.

This design permits rapid adjustment of the shoe and also permits changeover to different shoe designs for special purposes. The change is faster than with the prior art and no tools are required. The prior art arrangement was sufficiently troublesome to result in some users not adjusting the shoe and this results in wasting useable portions of the blade.

A more elegant way to provide for the adjustment is to use an eccentric on a pivoted shaft. This will operate in the same way but is more expensive to manufacture. The added cost is not thought to be justified.

I claim:

1. A power saw having a body including a nose section and including, a reciprocating saw blade projecting from said nose section, a post mounted in said nose section for slideable movement generally parallel to said saw blade, a guide shoe mounted for limited pivotal movement on said post, a plurality of transverse grooves spaced along the length of said post, a lock pin rotatably mounted in said nose section transverse and spaced from the axis of said post, said pin being rotatable between a lock position and a release position and having a portion engageable with whichever of said grooves is positioned adjacent the pin, a portion of said pin being shaped to clear and not engage said post when said pin is rotated to said release position, an end of said pin projecting from said nose section, and a lever mounted on said end of said pin for actuating said pin.

2. A power saw according to claim 1 in which said grooves have a radius equal to or slightly greater than the radius of said curved portion of said pin, the axes of said post and said pin being spaced more than the distance between the axis of said pin to said flat and the distance from the axis of said post to the material of said post between said grooves.

* * * * *